US008041143B2

United States Patent
Tse et al.

(10) Patent No.: US 8,041,143 B2
(45) Date of Patent: Oct. 18, 2011

(54) METHODS FOR BACKGROUND AND NOISE SUPPRESSION IN BINARY TO GRAYSCALE IMAGE CONVERSION

(75) Inventors: Francis Kapo Tse, Rochester, NY (US); Ramesh Nagarajan, Pittsford, NY (US); John Christopher Cassidy, Fairport, NY (US); Chia-Hao Lee, Hacienda Heights, CA (US); John W. Wu, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/905,736

(22) Filed: Oct. 15, 2010

(65) Prior Publication Data

US 2011/0033131 A1 Feb. 10, 2011

Related U.S. Application Data

(62) Division of application No. 11/500,397, filed on Aug. 8, 2006.

(51) Int. Cl.
*G06K 9/00* (2006.01)
*G06K 9/34* (2006.01)
*G06K 9/46* (2006.01)
*G06K 9/66* (2006.01)
*G06K 9/36* (2006.01)
*G06K 9/20* (2006.01)
*G06K 15/00* (2006.01)
*H04N 1/40* (2006.01)
*H04N 5/228* (2006.01)
*H04N 5/20* (2006.01)
*H04N 5/14* (2006.01)
*H04N 9/64* (2006.01)

(52) U.S. Cl. ........ 382/260; 382/169; 382/173; 382/190; 382/282; 358/2.1; 358/3.01; 358/3.23; 358/3.24; 358/448; 348/222.1; 348/254; 348/571; 348/671

(58) Field of Classification Search .......... 382/168–169, 382/173, 176, 181, 190, 195, 199, 205, 254–255, 382/260–266, 274–275, 276, 282; 358/1.9, 358/2.1, 3.01, 3.21, 3.23–3.24, 3.27, 443, 358/448, 452, 462–463; 348/222.1, 254, 348/571, 671

See application file for complete search history.

(56) References Cited

U.S. PATENT DOCUMENTS

| | | | |
|---|---|---|---|
| 5,237,646 A * | 8/1993 | Bunce | 358/1.18 |
| 5,450,502 A | 9/1995 | Eschbach et al. | |
| 5,471,320 A * | 11/1995 | Jodoin et al. | 358/3.08 |
| 5,493,419 A * | 2/1996 | Jodoin et al. | 358/3.08 |
| 5,696,845 A | 12/1997 | Loce et al. | |
| 6,343,159 B1 | 1/2002 | Cuciurean-Zapan et al. | |

(Continued)

*Primary Examiner* — Anand Bhatnagar
*Assistant Examiner* — Nathan Bloom
(74) *Attorney, Agent, or Firm* — Pillsbury Winthrop Shaw Pittman LLP

(57) ABSTRACT

One embodiment is a method for suppressing background inaccuracies in binary to grayscale image conversion. A binary image is converted to a grayscale image using a neighbor map. An image enhancement function is applied to the grayscale image to suppress background inaccuracies in the grayscale image. Another embodiment is method for converting a binary pixel of a binary image to a grayscale pixel of a grayscale image and suppressing noise in the grayscale image using selective filtering of the binary image. Another embodiment is a method for converting a binary image to a first grayscale image and suppressing noise in the first grayscale image to produce a noise suppressed grayscale image using selective filtering of the first grayscale image.

7 Claims, 6 Drawing Sheets

U.S. PATENT DOCUMENTS

| | | |
|---|---|---|
| 6,807,304 B2 | 10/2004 | Loce et al. |
| 7,492,486 B2 | 2/2009 | McCandlish et al. |
| 7,561,747 B2 | 7/2009 | Tse et al. |
| 7,580,569 B2 | 8/2009 | Tse et al. |
| 7,697,789 B2 | 4/2010 | McCandlish et al. |
| 7,773,254 B2 | 8/2010 | Nagarajan et al. |
| 2001/0055122 A1 | 12/2001 | Nagarajan et al. |
| 2005/0018918 A1* | 1/2005 | Keithley ............... 382/254 |
| 2007/0109602 A1 | 5/2007 | Tse et al. |
| 2007/0134561 A1* | 6/2007 | Butterfield et al. ............... 430/5 |

* cited by examiner

METHODS FOR BACKGROUND AND NOISE SUPPRESSION IN BINARY TO GRAYSCALE IMAGE CONVERSION

RELATED APPLICATIONS

This application is a divisional of and claims priority to U.S. patent application Ser. No. 11/500,397, filed Aug. 8, 2006, which is hereby incorporated by reference in its entirety.

BACKGROUND

1. Technical Field

The presently disclosed embodiments are directed to methods and systems for background suppression and noise suppression in binary to grayscale image conversion. More specifically, background inaccuracies produced in binary to grayscale image conversion are suppressed using an image enhancement function or tone reproduction curve, and noise created in transition areas during binary to grayscale image conversion is suppressed using a filter.

2. Description of Related Art

Conventionally, a typical black and white image on photographic film, for example, includes various gray levels of light. That is, different amounts of light are reflected from various spots of the image on the film, providing what is known as a continuous tone photographic image. It is conventionally known how to digitize the grayscale continuous tone photographic image. More specifically, each pixel or spot of the photographic image is assigned a number representing the amount of light or gray level of that particular spot. Typically, an eight-bit word is used, giving 256 different digitized gray levels of light. The digitized image is known as a continuous tone, or continuous tone, digital image. Further, it is possible to go back and forth between the analog and digital images and maintain a reasonable reproduction of the image.

It is also conventionally known to provide an image on a recording medium, for example, a paper sheet, rather than on photographic film. For example, a modulated laser can be used to scan a xerographic drum to give a series of black and white spots. The spots are formed by turning the laser on and off. The image on the drum is then developed and transferred to a copy sheet. This process of developing black and white spots provides a binary image, but does not generate a continuous tone image.

It is possible, however, to create the impression of a continuous tone image by using halftoning. The halftone process uses a mathematically stored screen pattern or array, for example, which is an almost-sinusoidal two-dimensional pattern. The process converts the original or continuous tone image into an image of black and white spots that "appears" to be a continuous tone image. This process is generally accomplished by systematically comparing each pixel's continuous tone value with the value of the screen. If the continuous tone value of the pixel is less dense than the screen value, then a white spot is produced. On the other hand, if the pixel value is more dense than the screen value, a black spot is produced. It should be understood that the pixel values are the 8-bit grayscale values for each pixel of the original image.

In effect, this procedure converts a grayscale image into black and white spots, but gives the impression of multiple gray levels by producing more white spots for a less-dense area and more black spots for a denser area. Although a true continuous tone image is not produced by this procedure, the procedure has two advantages. One advantage is that each spot of the image is described with one bit, rather than the eight-bit word used for each gray level pixel in the original continuous tone picture. This allows the halftone image to be stored with approximately ⅛ of the storage of the original continuous tone image. Another advantage is that, in fact, a halftone image can be printed on paper. In other words, the conversion takes each eight-bit pixel value representing a grayscale value, compares the pixel value to a screen value and provides either a zero (0) or a one (1) to modulate the laser. This image can then be printed on a recording medium such as paper.

The use of a tone reproduction curve (TRC) is described in U.S. Pat. No. 5,450,502 (hereinafter "the '502 patent'"), the disclosure of which is incorporated herein by reference. A TRC is defined as a function that describes the relationship of the input to the output within a system for the purposes of image enhancement. This function is then applied to the full input image.

Currently known techniques to convert binary images to continuous tone images are described in U.S. Pat. No. 6,343,159 (hereinafter "the '159 patent'"), the disclosure of which is incorporated herein by reference. These techniques include using a look up table (LUT) to convert one bit values in a neighbor of image pixels into grayscale values and using a spatial filter to approximate the original grayscale values.

SUMMARY

One embodiment is a method for converting a binary pixel of a binary image to a grayscale pixel of a grayscale image and suppressing background inaccuracies in the grayscale image. A binary image is inputted or scanned. A binary pixel of the binary image is associated with a neighbor map. The binary pixel is converted to a grayscale pixel based on the neighbor map. An image enhancement function is applied to the grayscale pixel to suppress background inaccuracies in the grayscale image.

Another embodiment is a method for converting a binary pixel of a binary image to a grayscale pixel of a grayscale image and suppressing noise in the grayscale image using selective filtering of the binary image. A binary image is inputted or scanned. A binary pixel of the binary image is associated with a neighbor map. The neighbor map is converted to a weighting value. The neighbor map is filtered to produce a first grayscale pixel value. The neighbor map is compared to one or more binary patterns of a conversion look up table to produce a second grayscale pixel value. An inverted weighting value is multiplied by the first grayscale pixel value to produce a first weighted grayscale pixel value. The weighting value is multiplied by the second grayscale pixel value to produce a second weighted grayscale pixel value. The first weighted grayscale pixel value and the second weighted grayscale pixel value are summed to produce the grayscale pixel and suppress noise.

Yet another embodiment is a method for converting a binary image to a first grayscale image and suppressing noise in the first grayscale image to produce a noise suppressed grayscale image using selective filtering of the first grayscale image. A binary image is inputted or scanned. A binary pixel of the binary image is associated with a neighbor map. Each binary pixel of the binary image is converted to a first grayscale pixel of a first grayscale image based on the binary neighbor map. A grayscale neighbor map is created for each first grayscale pixel. Each grayscale neighbor map is converted to a selection value. Each grayscale neighbor map is filtered to produce a second grayscale pixel. A noise suppressed grayscale image is produced by selecting each noise suppressed grayscale pixel as the first grayscale pixel if the selection value is a first selection value and selecting each noise suppressed grayscale pixel as the second grayscale pixel if the each selection value is a second selection value.

Other objects, features, and advantages of the present application will become apparent from the following detailed description, the accompanying drawings, and the appended claims.

Figure 1:
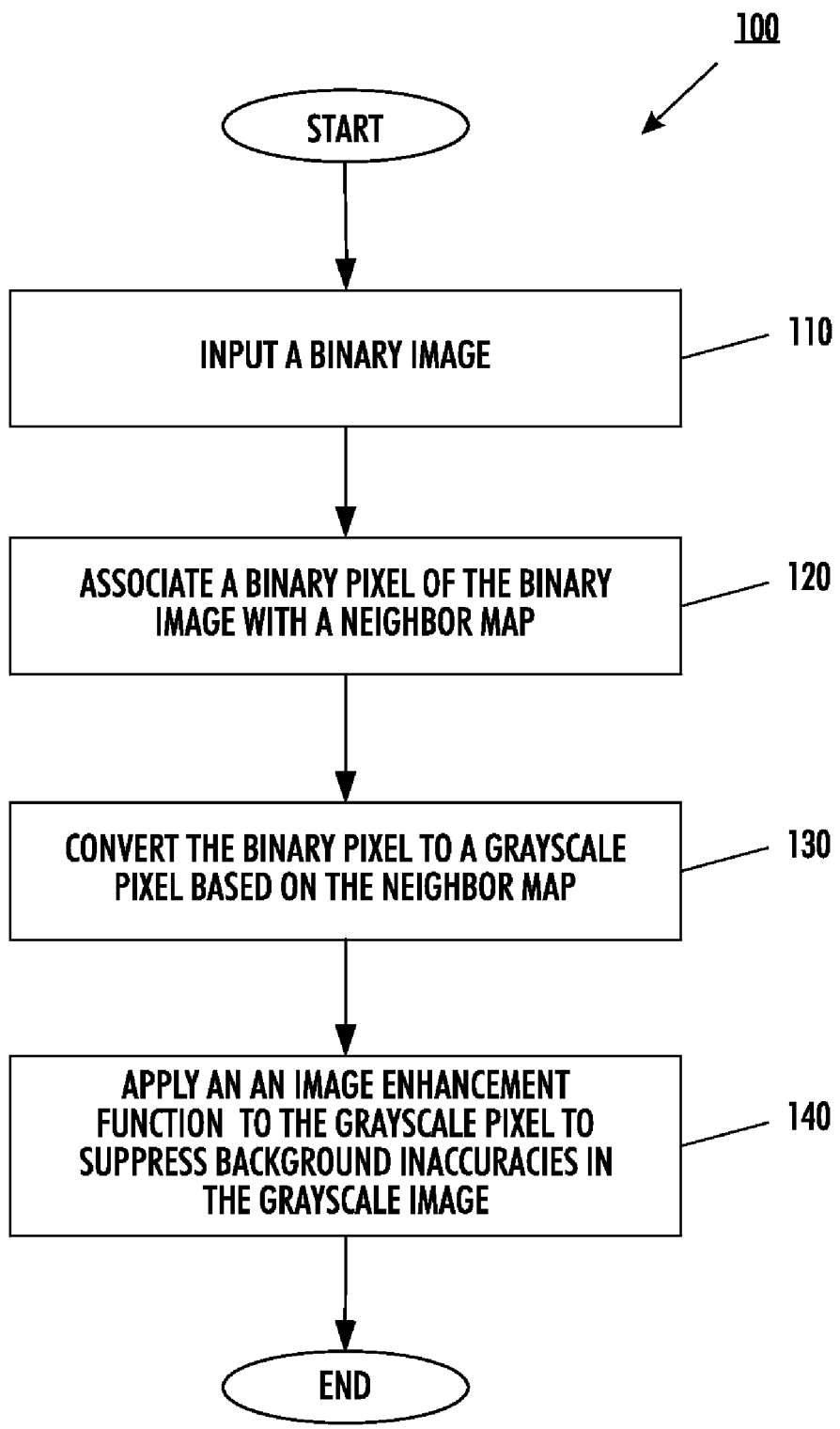
FIG. 1 is a flowchart showing a method for converting a binary pixel of a binary image to a grayscale pixel of a grayscale image and suppressing background inaccuracies in the grayscale image, in accordance with an embodiment.

Before one or more embodiments are described in detail, one skilled in the art will appreciate that an embodiment is not limited in its application to the details of construction, the arrangements of components, and the arrangement of steps set forth in the following detailed description or illustrated in the drawings. An embodiment is capable of being practiced or being carried out in various ways. Also, it is to be understood that the phraseology and terminology used herein is for the purpose of description and should not be regarded as limiting.

DETAILED DESCRIPTION

Restoration of gray values in an image from one bit values can be accomplished in many ways. In one of the ways, a filter is applied to the image to determine the gray value from the local low frequency content of a neighborhood of image pixels. A second method is to use a look up table (LUT) to convert the one bit values in a neighborhood of image pixels into a gray value as described in the '159 patent.

The LUT approach restores gray well, but often the tone scale is not perfectly reproduced. This is especially evident in the light background areas of an image or in black areas like the inside of large black text. For example, if there are any one bit values in a white background, the derived LUT will yield an eight bit value that is not perfectly white. This causes an image with a white background to have a visible background that is not perfectly white. A white background that is not perfectly white contains background inaccuracies.

In one embodiment, a TRC is used in conjunction with a LUT in a one bit to eight bit conversion process in order to adjust tone characteristics and suppress background inaccuracies. The TRC is used to adjust the tone scale to compensate for background inaccuracies in the LUT conversion. This tone scale adjustment can include, for example, making very light values completely white.

The TRC is used to eliminate background that is produced by the LUT conversion in the white areas of an image. The TRC adjusts the lightness in the lighter areas of the image. As described in the '502 patent the TRC is an image enhancement function. This image enhancement function can be a continuous or a discontinuous function. One exemplary discontinuous image enhancement function is an image enhancement function that makes all grayscale values less than or equal to 250 equal to their original values and all grayscale values greater than 250 equal to 255.

FIG. 1 is a flowchart showing a method 100 for converting a binary pixel of a binary image to a grayscale pixel of a grayscale image and suppressing background inaccuracies in the grayscale image, in accordance with an embodiment.

In step 110 of method 100, a binary image is inputted or scanned. The binary image is inputted or scanned by a printer, for example. The binary image can also be retrieved from a memory, or from a network location.

Figure 2:
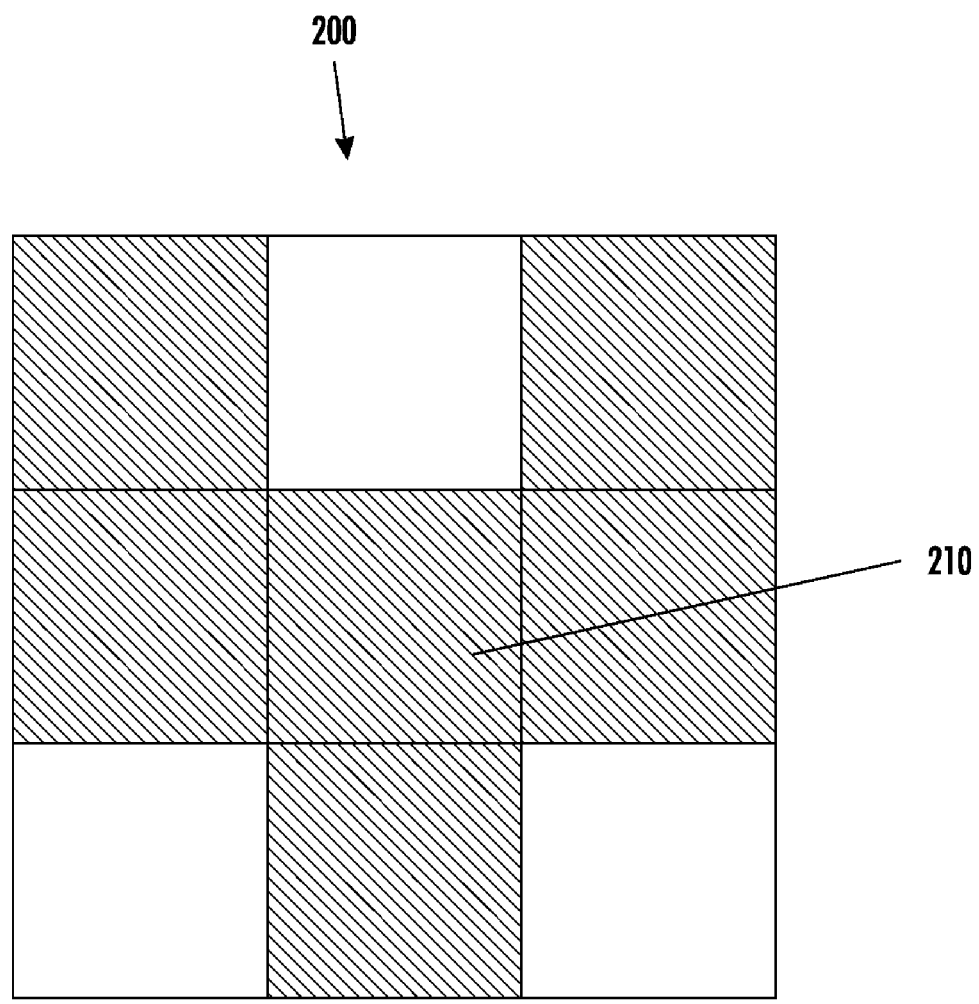
FIG. 2 is an exemplary 3×3 neighbor map, in accordance with an embodiment.

In step 120, a binary pixel of the binary image is associated with a neighbor map. A neighbor map refers to those pixels in proximity to the binary pixel selected. It can include those pixels bordering the selected pixel, or it may include a broader range. An exemplary neighbor map is shown in FIG. 2.

In step 130, the binary pixel is converted to a grayscale pixel based on the neighbor map. The binary pixel is a one bit value and the grayscale pixel is an eight bit value, for example.

In step 140, an image enhancement function is applied to the grayscale pixel to suppress background inaccuracies in the grayscale image. The image enhancement function is, for example, a tone reproduction curve. Background inaccuracies can include, but are not limited to, spurious gray grayscale values in a white background that should be perfectly white. An image enhancement function can, but is not limited to, suppressing background inaccuracies by making spurious gray grayscale values in a white background completely white grayscale values.

In another embodiment, the image enhancement function is incorporated directly into an LUT conversion method by adjusting the specific output values of the LUT. This embodiment reduces the amount of image processing required.

Methods for converting the binary pixel to a grayscale pixel based on the neighbor map have been described in the '159 patent. These methods include an LUT conversion and a filtering conversion. An exemplary LUT conversion includes comparing the neighbor map to one or more binary patterns of a LUT and assigning a grayscale value corresponding to a binary pattern of the LUT matching the neighbor map to the grayscale pixel. An exemplary filtering conversion includes filtering the neighbor map.

FIG. 2 is an exemplary 3×3 neighbor map 200, in accordance with an embodiment. Map 200 need not be square, as shown, and can have other shapes, such as generally diamond. Pixel 210 of map 200 is the binary pixel being converted. Pixel 210 is shown with a binary value of one. The surrounding eight pixels are the "neighbors" of pixel 210. These surrounding eight pixels are used to determine the grayscale value of pixel 210. Maps similar to map 200 are used to determine the grayscale value of each of the pixels of a binary image. Map 200, therefore, represents a window that is moved from pixel to pixel over the binary image to determine the grayscale value of each pixel from the neighboring pixels captured by the window.

The grayscale value is determined from the window represented by map 200 in a number of ways including LUT conversion and filtering conversion. In an LUT conversion, for example, map 200 is compared to a 3×3 pattern of the LUT to determine the grayscale value of pixel 210. In a filtering conversion, map 200 is passed through a filter to determine the grayscale value of pixel 210.

In addition to suppressing background inaccuracies it is also advantageous to reduce image noise produced during the binary to grayscale conversion. In another embodiment, noise is reduced by filtering the image with a filter that smoothes out the noise. A low-pass filter, for example, removes all abrupt low to high or high to low transition areas essentially blurring or smoothing sharp lines between black and white. Note, however, that the use of a low-pass filter can also smooth out the edges of text that is located in the image. This low-pass filtering of text can reduce the quality of the text.

In order to smooth the image while maintaining the sharpness of the text, in another embodiment the filter is selectively applied in the highlight areas where the noise is most visible. This method uses a filter in conjunction with a LUT in the one bit to eight bit conversion process in order to suppress noise in highlight areas of the image while maintaining sharp edges in text regions. The filter is used to smooth the noise and is selectively used in the highlight areas by determining the lightness value of the pixel being processed. If the value is above a threshold, the filter is applied. If the value is below the threshold value, the LUT value is used without filtering. In general, a transition region of lightness values can be used. In the transition region the final value of the pixel is determined by a weighted combination of the LUT value and the filtered LUT value. This eliminates defects in areas of the image where the lightness is transitioning between a low value and a high value.

Figure 3:
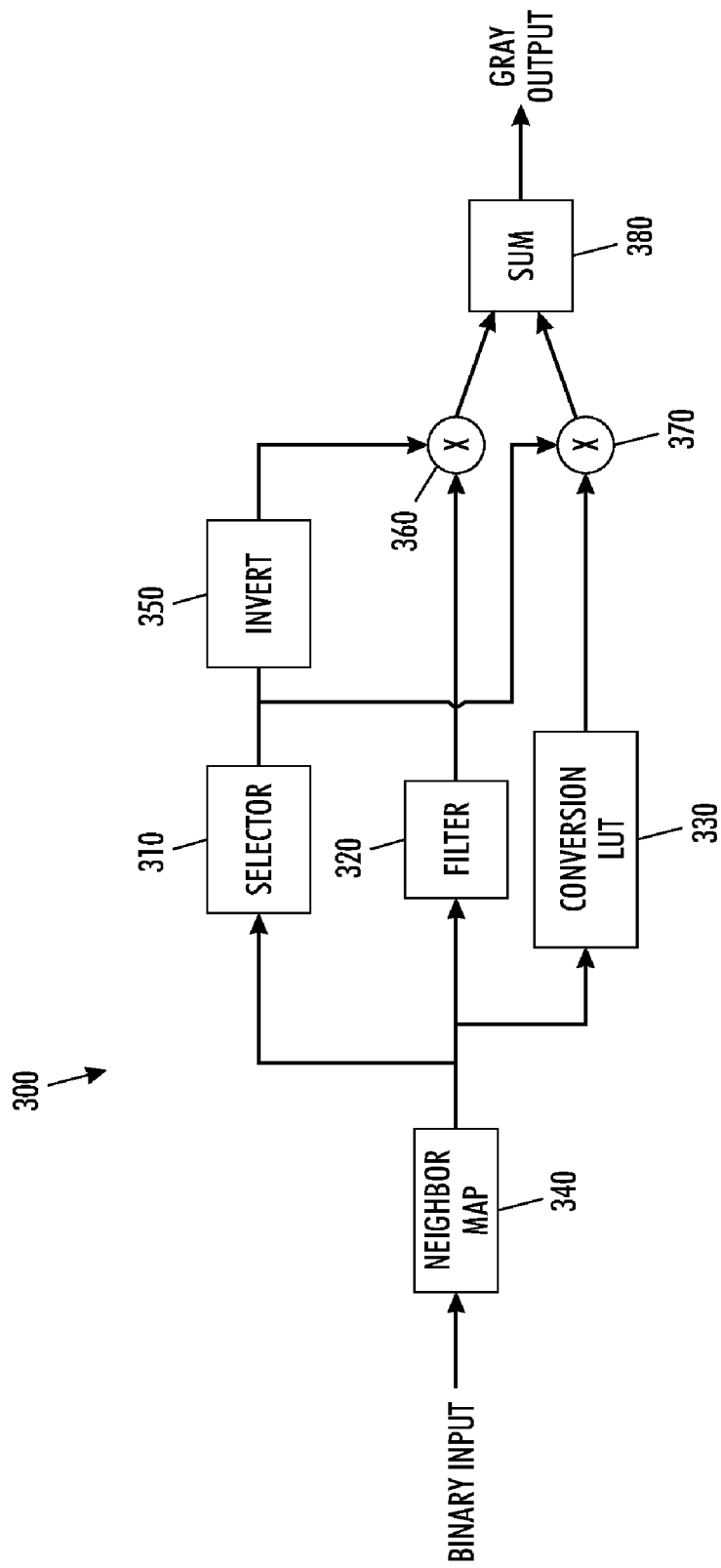
FIG. 3 is schematic diagram showing a system for converting a binary pixel of a binary image to a grayscale pixel of a grayscale image and suppressing noise in the grayscale image using selective filtering of the binary image, in accordance with an embodiment.

FIG. 3 is schematic diagram showing a system 300 for converting a binary pixel of a binary image to a grayscale pixel of a grayscale image and suppressing noise in the grayscale image using selective filtering of the binary image, in accordance with an embodiment. System 300 includes control LUT 310, filter 320, and conversion LUT 330. Filter 320 is used to determine the grayscale values in lighter areas, conversion LUT 330 is used to determine the grayscale values in darker areas, and control LUT 310 is used to determine the lightness or darkness in an area of the binary and assign the contributions of filter 320 and conversion LUT 330 in determining the grayscale value.

A binary image is scanned or input to system 300 by a printer, for example. The binary image can also be retrieved from a memory, or from a network location. Neighbor map 340 is associated with or created for each pixel of the binary image. Neighbor map 340 is converted to a weighting value by control LUT 310, to a first grayscale pixel value by filter 320, and to a second grayscale pixel value by conversion LUT 330. The weighting value, the first grayscale pixel value, and the second grayscale pixel value are created at substantially the same time.

The inverted weighting value is created by inverter 350. The inverted weighting value is multiplied by the first grayscale pixel value using multiplier 360 producing a first weighted grayscale pixel value. The uninverted weighting value is multiplied by the second grayscale pixel value using multiplier 370 producing a second weighted grayscale pixel value. Finally, the first weighted grayscale pixel value and the second weighted grayscale pixel value are summed by summation 380 to produce a grayscale pixel value.

In system 300, the binary input is sent through conversion LUT 330 and through filter 320 to convert the one bit value to an eight bit value. Filter 320 output and conversion LUT 330 output are weighted according to the weights determined by the control LUT 310. If the eight bit lightness value is high, filter 320 output gets a high weighting value and conversion LUT 330 output gets a low weighting value. If the eight bit lightness value is low, filter 320 output gets a low weighting value, while conversion LUT 330 output gets a high weighting value. This makes the gray output like filter 320 output when the input lightness is high and like conversion LUT 330 output when the input lightness is low.

Control LUT 310 can provide an abrupt change in the weighting value or a gradual change in the weighting value. A binary control LUT 310 provides a weighting value of one for darker regions up to a certain threshold, for example. Beyond that threshold the binary control LUT 310 provides a weighting value of zero, providing an abrupt change in the weighting value and an abrupt change from LUT conversion to filtering. A varying control LUT 310, on the other hand, provides weighting values between zero and one providing a gradual change in weighting values. The use of a varying control LUT 310 helps to remove defects when the lightness switches abruptly from high to low or low to high by allowing contributions from both LUT conversion and filtering.

Figure 4:
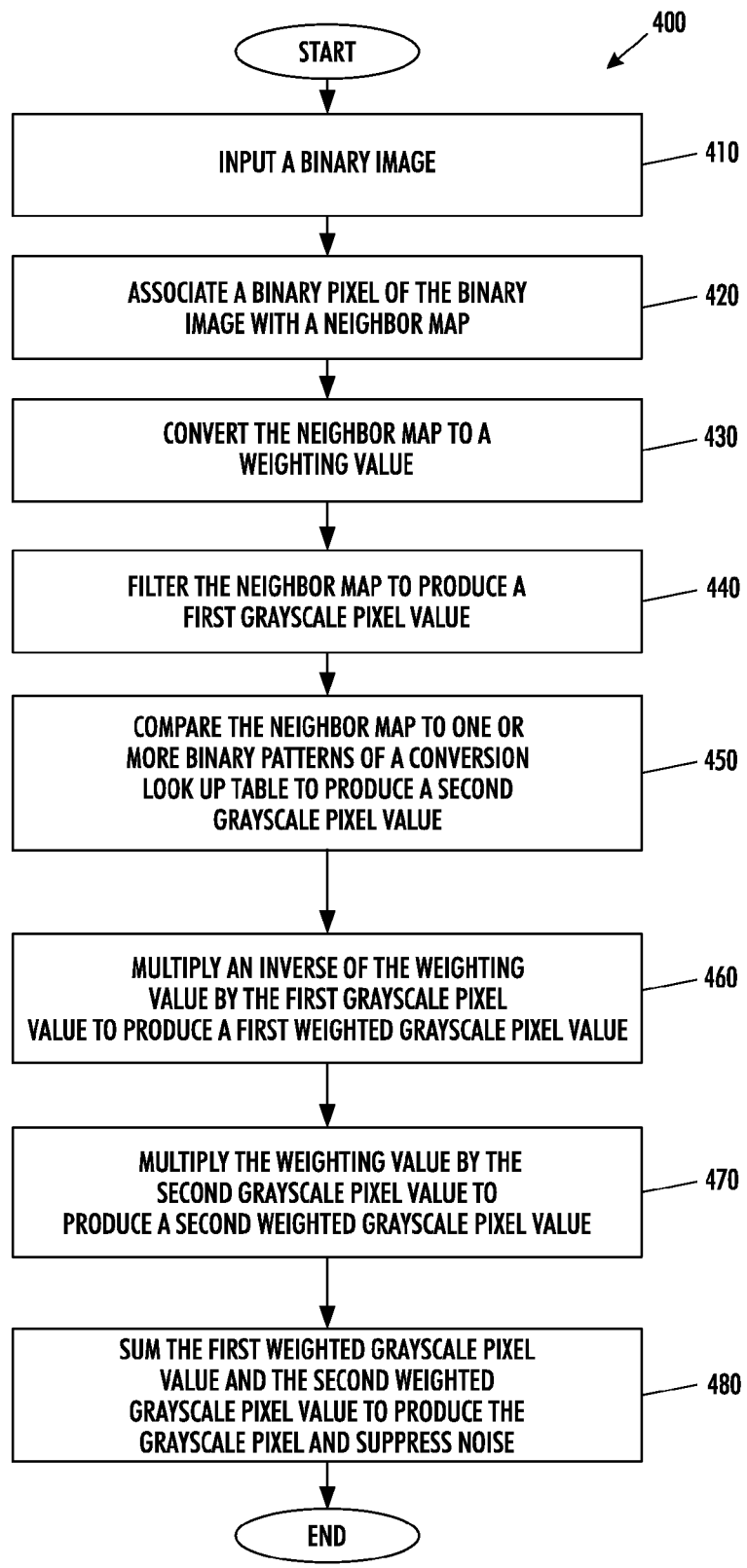
FIG. 4 is a flowchart showing a method for converting a binary pixel of a binary image to a grayscale pixel of a grayscale image and suppressing noise in the grayscale image using selective filtering of the binary image, in accordance with an embodiment.

FIG. 4 is a flowchart showing a method 400 for converting a binary pixel of a binary image to a grayscale pixel of a grayscale image and suppressing noise in the grayscale image using selective filtering of the binary image, in accordance with an embodiment.

In step 410 or method 400, a binary image is inputted or scanned. The binary image is inputted or scanned by a printer, for example. The binary image can also be retrieved from a memory, or from a network location.

In step 420, a binary pixel of the binary image is associated with a neighbor map. The binary pixel is a one bit value.

In step 430, the neighbor map is converted to a weighting value. The weighting value is, for example, a value greater than or equal to zero and less than or equal to one. In another embodiment, the weighting value can be one or zero.

The neighbor map is converted to a weighting value using a control LUT, for example. The neighbor map is compared to one or more binary patterns of the control LUT. A weighting value is produced corresponding to a binary pattern of the control LUT that matches the neighbor map.

In another embodiment, the neighbor map is converted to a weighting value using a threshold value. The values of the neighbor map are summed to produce a neighbor map value. The neighbor map value is compared to the threshold value. One is assigned to the weighting value, if the neighbor map value is greater than the threshold value. Zero is assigned to the weighting value, if the neighbor map value is less than or equal to the threshold value.

In another embodiment, the neighbor map is converted to a weighting value using a threshold value. The values of the neighbor map are summed to produce a neighbor map value. The neighbor map value is compared to the threshold value. Zero is assigned to the weighting value, if the neighbor map value is greater than the threshold value. One is assigned to the weighting value, if the neighbor map value is less than or equal to the threshold value.

In step 440, the neighbor map is filtered to produce a first grayscale pixel value. The first grayscale pixel value is an eight bit value, for example.

In step 450, the neighbor map is compared to one or more binary patterns of a conversion look up table to produce a second grayscale pixel value.

In step 460, an inverted weighting value is multiplied by the first grayscale pixel value to produce a first weighted grayscale pixel value. The inverted weighting value is, for example, the weighting value subtracted from one.

In step 470, the weighting value is multiplied by the second grayscale pixel value to produce a second weighted grayscale pixel value.

In step 480, the first weighted grayscale pixel value and the second weighted grayscale pixel value are summed to produce the grayscale pixel and suppress noise.

In another embodiment, filtering is applied to the grayscale image after it has been assembled using a conversion LUT. Filtering the grayscale image provides another level of smoothing at an additional computation cost. Also, rather than using a "continuous" mixing of the filtered and no-filtered data, the decision to select filtered or non-filtered data is improved by looking at the local grayness value. Filtering is applied only when a grayscale pixel is fully in a highlight region.

Figure 5:
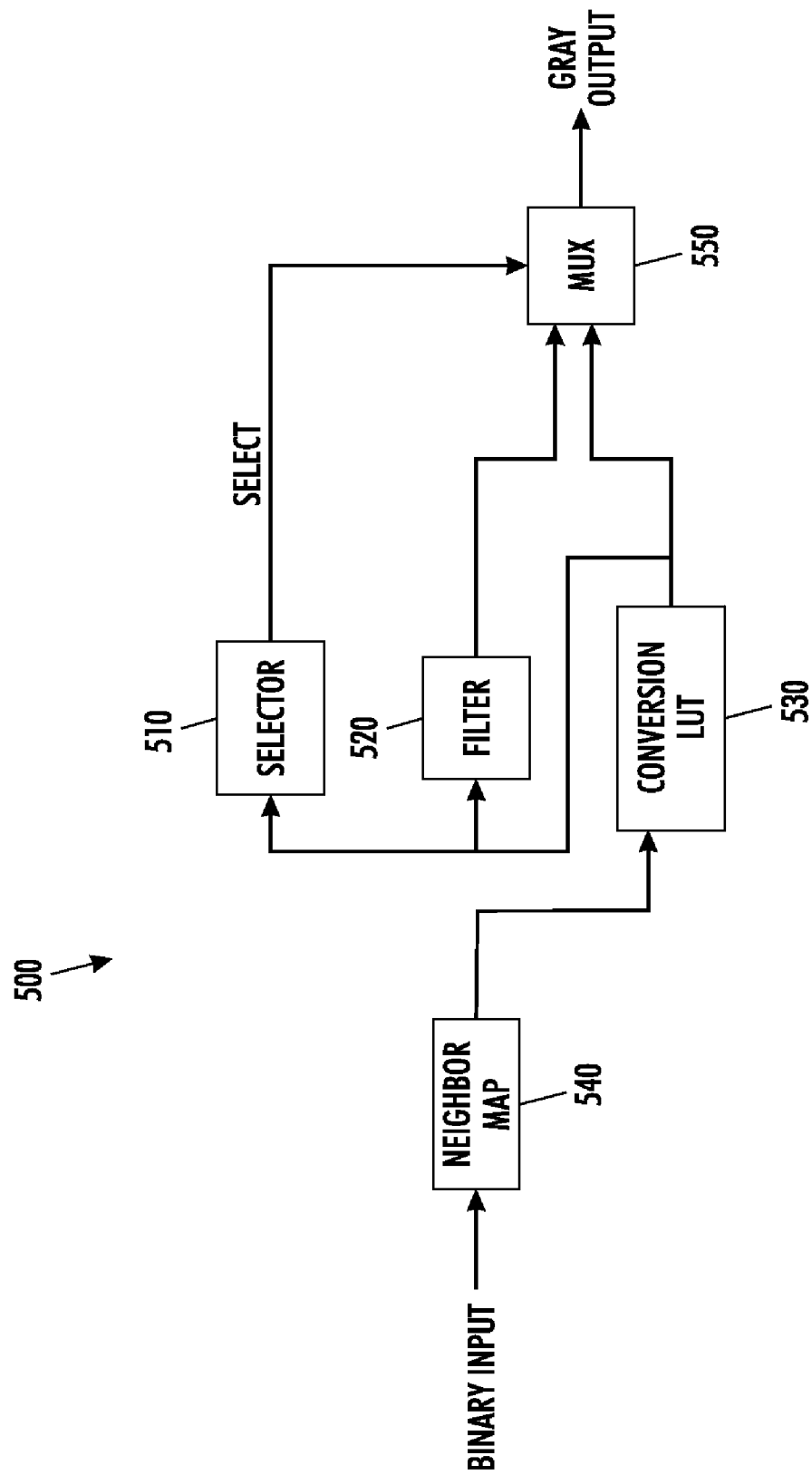
FIG. 5 is schematic diagram showing a system for converting a binary image to a first grayscale image and suppressing noise in the first grayscale image to produce a noise suppressed grayscale image using selective filtering of the first grayscale image, in accordance with an embodiment.

FIG. 5 is schematic diagram showing a system 500 for converting a binary image to a first grayscale image and suppressing noise in the first grayscale image to produce a noise suppressed grayscale image using selective filtering of the first grayscale image, in accordance with an embodiment. System 500 includes selector 510, filter 520, and conversion LUT 530. A binary image is scanned or input to system 500 by a printer, for example. The binary image can also be retrieved from a memory, or from a network location. A binary neighbor map 540 is associated with or created for each pixel of the binary image.

Each binary pixel of the binary image is converted to a first grayscale pixel of a first grayscale image based on each binary neighbor map 540 using conversion LUT 530. A grayscale neighbor map (not shown) is created for each first grayscale pixel. Each grayscale neighbor map is converted to a selection value using selector 510. Each grayscale neighbor map is also filtered using filter 520 to produce a second grayscale pixel for each first grayscale pixel. A noise suppressed grayscale image is produced by selecting each noise suppressed grayscale pixel from either the first grayscale pixel or the second grayscale using multiplexer 550. The first grayscale pixel is selected by multiplexer 550 if the selection value of selector 510 is a first selection value. The second grayscale pixel is selected by multiplexer 550 if the selection value of selector 510 is a second selection value.

Figure 6:
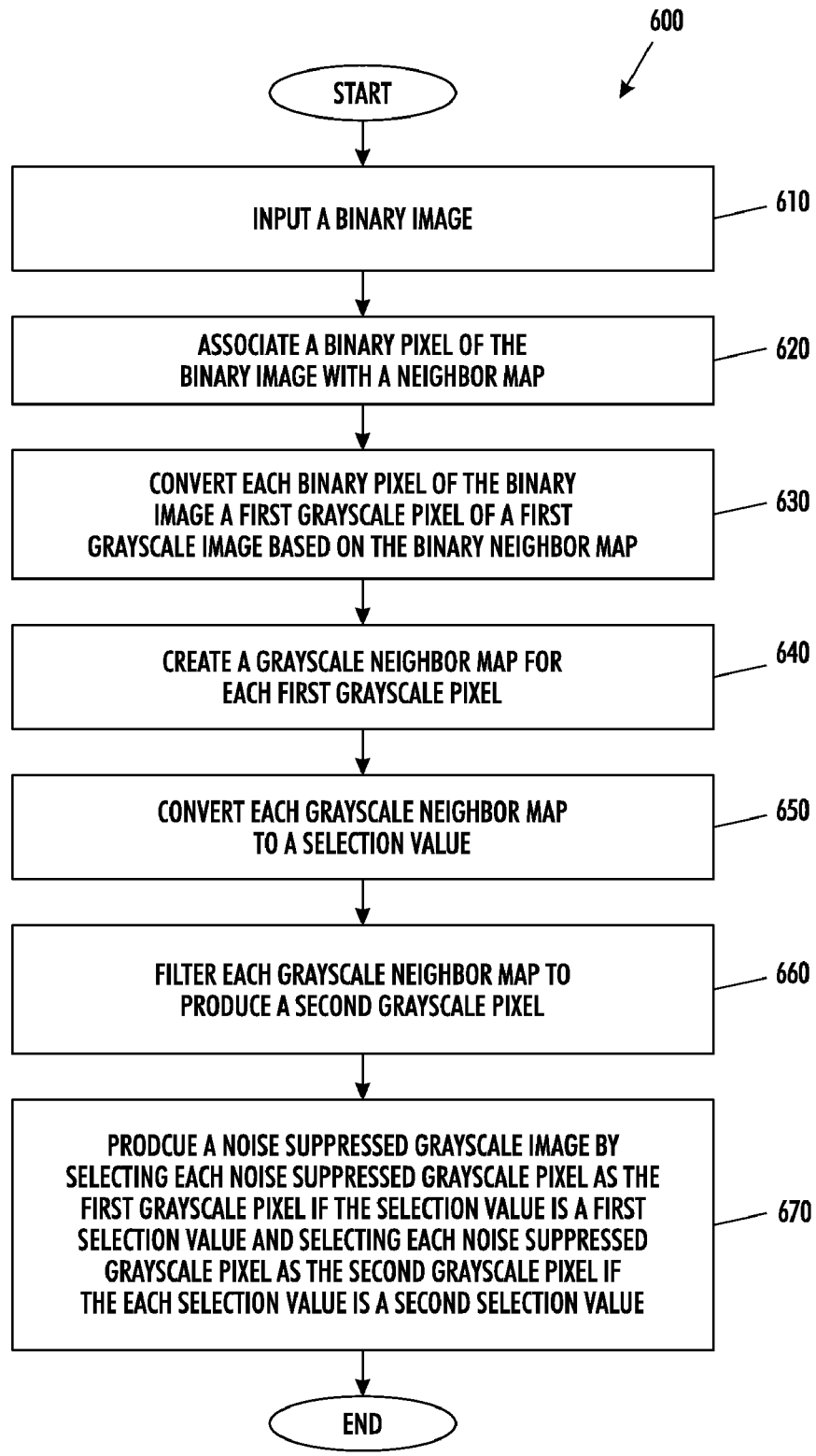
FIG. 6 is schematic diagram showing a method for converting a binary image to a first grayscale image and suppressing noise in the first grayscale image to produce a noise suppressed grayscale image using selective filtering of the first grayscale image, in accordance with an embodiment.

FIG. 6 is schematic diagram showing a method 600 for converting a binary image to a first grayscale image and suppressing noise in the first grayscale image to produce a noise suppressed grayscale image using selective filtering of the first grayscale image, in accordance with an embodiment.

In step 610 or method 600, a binary image is inputted or scanned. The binary image is inputted or scanned by a printer, for example. The binary image can also be retrieved from a memory, or from a network location.

In step 620, a binary pixel of the binary image is associated with a neighbor map. The binary pixel is a one bit value.

In step 630, each binary pixel of the binary image is converted to a first grayscale pixel of a first grayscale image based on the binary neighbor map. A first grayscale pixel is an eight bit value, for example. The binary image is converted to a first grayscale pixel of a first grayscale image based on the binary neighbor map using an LUT, for example. The binary neighbor map is compared to one or more binary patterns of the LUT. A grayscale value is assigned corresponding to a binary pattern of the LUT matching the binary neighbor map to the each first grayscale pixel.

In step 640, a grayscale neighbor map is created for each first grayscale pixel.

In step 650, each grayscale neighbor map is converted to a selection value. Each grayscale neighbor map is converted to a selection value using a threshold value, for example. Each first grayscale pixel of each neighbor in the each grayscale neighbor map is compared to a threshold value. The second selection value is assigned to the selection value, if the first grayscale pixel of all neighbors in the grayscale neighbor map are greater than the threshold value.

In another embodiment, each first grayscale pixel of each neighbor in the each grayscale neighbor map is compared to a threshold value. The first selection value is assigned to the selection value, if the first grayscale pixel of all neighbors in the grayscale neighbor map are less than the threshold value.

In step 660, each grayscale neighbor map is filtered to produce a second grayscale pixel. A second grayscale pixel is an eight bit value, for example.

In step 670, a noise suppressed grayscale image is produced by selecting each noise suppressed grayscale pixel as the first grayscale pixel if the selection value is a first selection value and selecting each noise suppressed grayscale pixel as the second grayscale pixel if the each selection value is a second selection value.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The claims can encompass embodiments in hardware, software, or a combination thereof.

The word "printer" as used herein encompasses any apparatus, such as a digital copier, bookmaking machine, facsimile machine, multi-function machine, etc. Which performs a print outputting function for any purpose.

Although a monochrome printing apparatus has been described in the Specification, the claims can encompass embodiments that print in color or handle color image data. Thus, the terms gray or grayscale refer to color tone, and not necessarily to gray as between black and white.

What is claimed is:

1. A method for converting a binary image to a grayscale image and suppressing noise in the grayscale image, comprising:
   receiving an input of the binary image comprising binary pixels;
   for each binary pixel:
   associating the binary pixel with a neighbor map;
   converting the neighbor map to a weighting value;
   filtering the neighbor map to produce a first grayscale pixel value;
   comparing the neighbor map to one or more binary patterns of a conversion look up table to produce a second grayscale pixel value;
   multiplying an inverted weighting value by the first grayscale pixel value to produce a first weighted grayscale pixel value;
   multiplying the weighting value by the second grayscale pixel value to produce a second weighted grayscale pixel value; and summing the first weighted grayscale pixel value and the second weighted grayscale pixel value to produce a grayscale pixel and suppress noise.

2. The method of claim 1, wherein the weighting value comprises a value greater than or equal to zero and less than or equal to one.

3. The method of claim 2, wherein the inverted weighting value comprises the difference between the weighting value and one.

4. The method of claim 1, wherein the weighting value comprises one of one and zero.

5. The method of claim 1, wherein converting the neighbor map to a weighting value comprises:
   comparing the neighbor map to one or more binary patterns of a control look up table; and
   producing a weighting value corresponding to a binary pattern of the control look up table matching the neighbor map.

6. The method of claim 1, wherein converting the neighbor map to a weighting value comprises:
   summing the values of the neighbor map to produce a neighbor map value;
   comparing the neighbor map value to a threshold value;
   assigning one to the weighting value, if the neighbor map value is greater than the threshold value; and
   assigning zero to the weighting value, if the neighbor map value is less than or equal to the threshold value.

7. The method of claim 1, wherein converting the neighbor map to a weighting value comprises:
   summing the values of the neighbor map to produce a neighbor map value;
   comparing the neighbor map value to a threshold value;
   assigning zero to the weighting value, if the neighbor map value is greater than the threshold value; and
   assigning one to the weighting value, if the neighbor map value is less than or equal to the threshold value.

* * * * *